A. H. MOFFET.
RAIL FASTENING.
APPLICATION FILED JUNE 6, 1911.
1,014,087.
Patented Jan. 9, 1912.
3 SHEETS—SHEET 1.
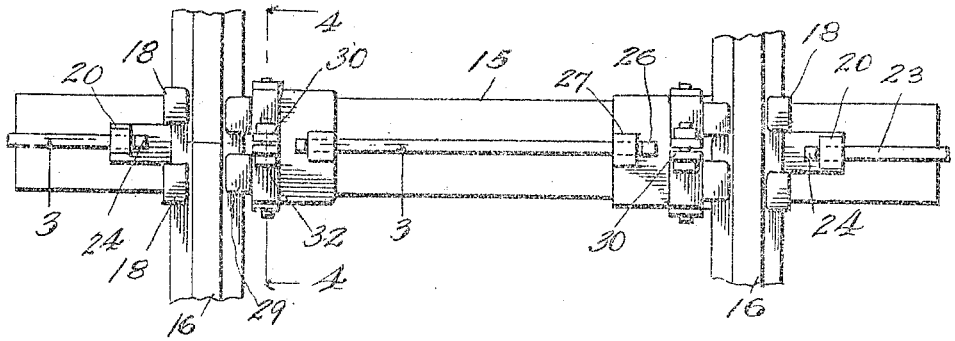
FIG. 1.
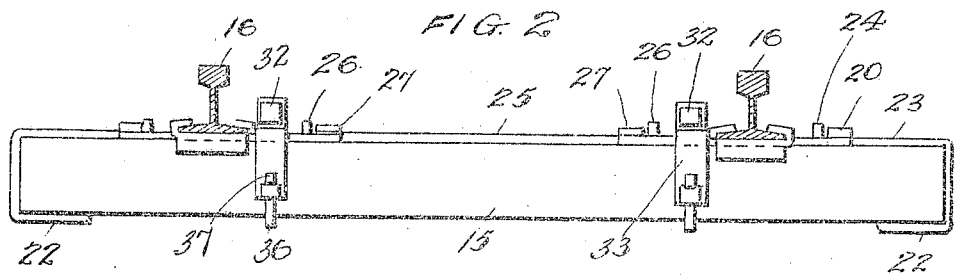
FIG. 2.
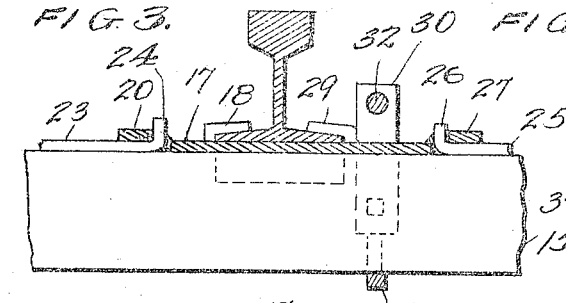
FIG. 3. FIG. 4.
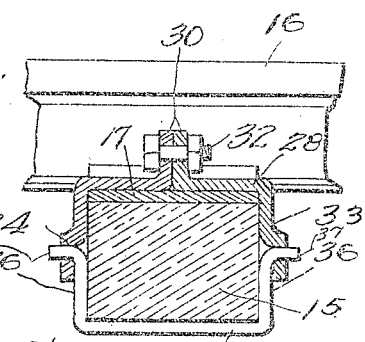
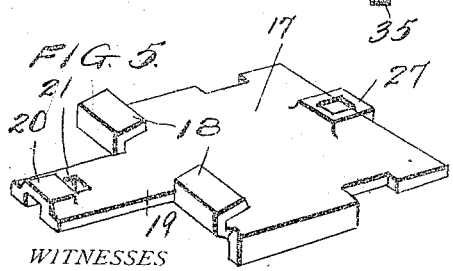
FIG. 5. FIG. 6.
WITNESSES
C. K. Davies
A. C. Welch
INVENTOR
Alvar H. Moffet
by
Attorney

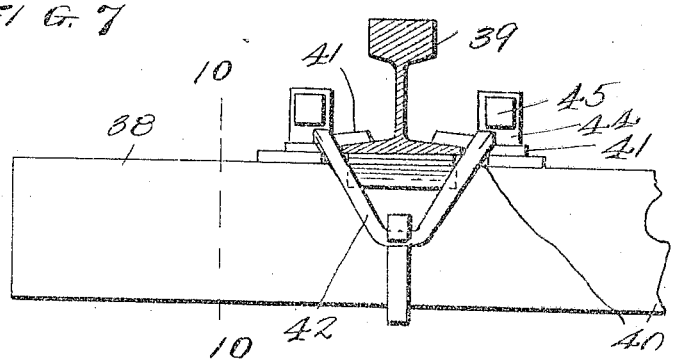
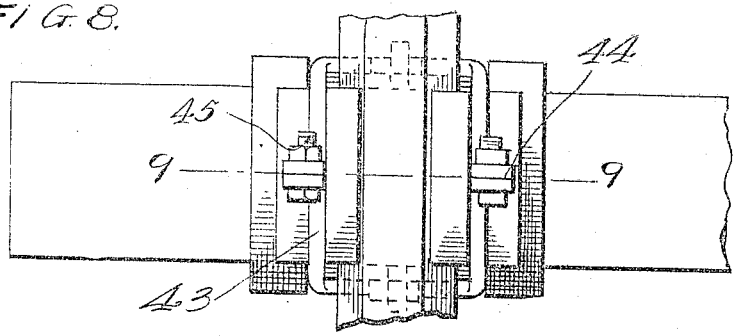
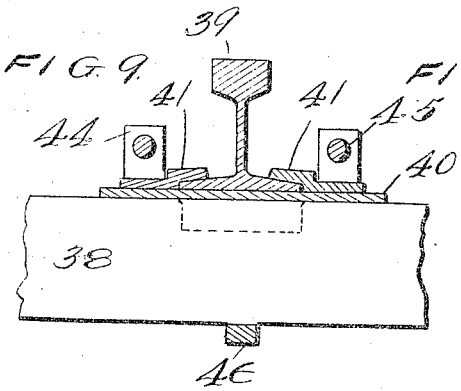
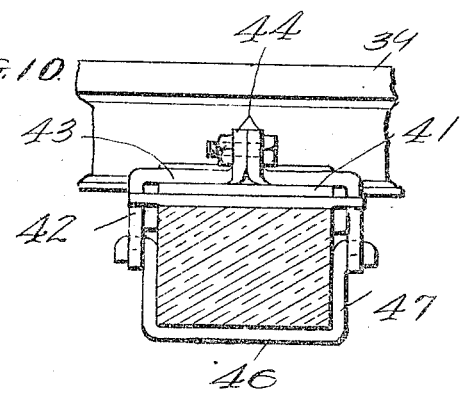

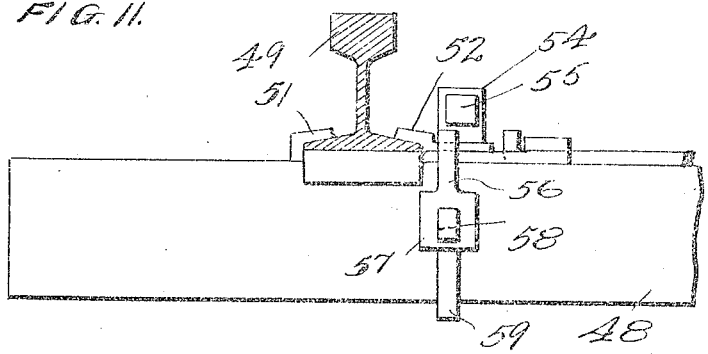
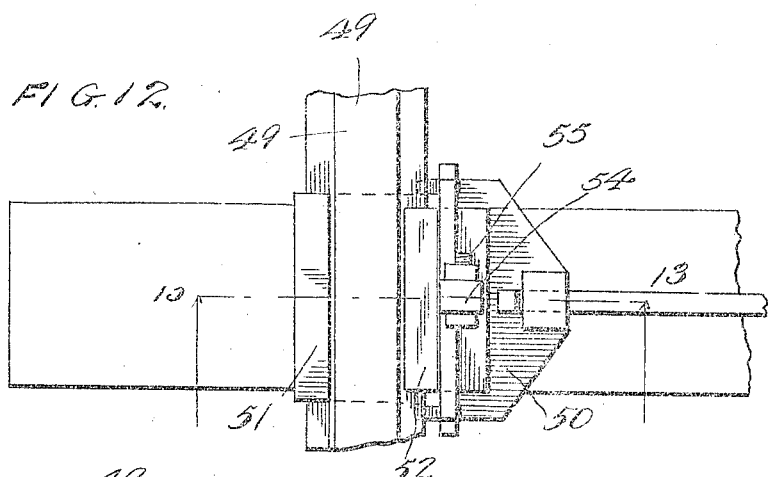
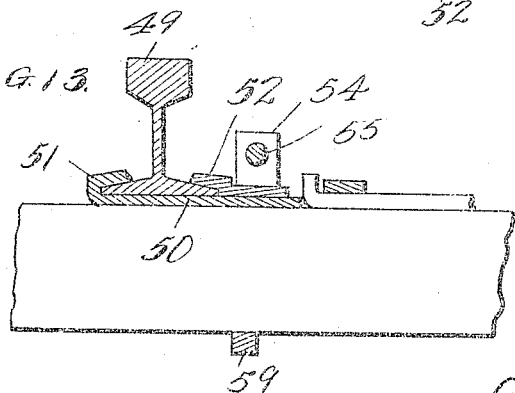
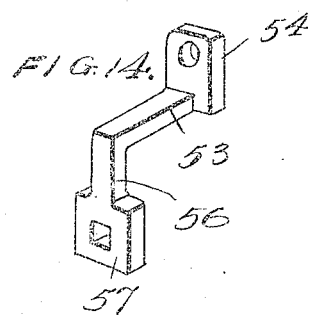

UNITED STATES PATENT OFFICE.

ALVUS H. MOFFET, OF LARNED, KANSAS.

RAIL-FASTENING.

1,014,087. Specification of Letters Patent. Patented Jan. 9, 1912.

Application filed June 8, 1911. Serial No. 632,068.

*To all whom it may concern:*

Be it known that I, ALVUS H. MOFFET, a citizen of the United States, residing at Larned, in the county of Pawnee and State of Kansas, have invented new and useful Improvements in Rail-Fastenings, of which the following is a specification.

The present invention relates to means for fastening railroad rails to ties, and the object is to provide a novel, simple and effective mechanism of this character that can be applied to a tie, without weakening or otherwise deleteriously affecting the same.

Three embodiments of the invention are illustrated in the accompanying drawings, wherein—

Figure 1 is a plan view of one form of construction. Fig. 2 is a side elevation of the same. Figs. 3 and 4 are respectively sectional views on the lines 3—3 and 4—4 of Fig. 1. Fig. 5 is a detail perspective view of the tie plate. Fig. 6 is a similar view of one of the clips. Fig. 7 is a side elevation of a modified form of construction. Fig. 8 is a plan view of the same. Fig. 9 is a sectional view on the line 9—9 of Fig. 8. Fig. 10 is a sectional view on the line 10—10 of Fig. 7. Fig. 11 is a side elevation of still another embodiment of the invention. Fig. 12 is a plan view thereof. Fig. 13 is a sectional view on the line 13—13 of Fig. 12. Fig. 14 is a perspective view of the clip employed in this last disclosed embodiment.

Referring to the form of construction illustrated in Figs. 1–6 inclusive, the tie is designated 15, and the rails thereon are shown at 16. Interposed between each rail and the tie, is a tie plate 17 having integral rail base engaging hooks 18 that embrace the base flange of the rail on one side. Between these hooks, a tongue 19 projects, said tongue having an upset loop 20, behind which is arranged an opening 21. A hook 22 that extends around the end of the tie, has its shank portion 23 passing beneath the loop 20, and has an upturned terminal 24 engaged behind the same. A connecting bar 25, disposed longitudinally upon the tie 15, between the rails, has upturned ends 26 that are engaged with the inner ends of the tie plate, said bar passing beneath upset loops 27 formed upon said inner ends of the tie plate.

A pair of combined clips and rail securing plates 28, one of which is shown specifically in Fig. 6, extend over the tie plate on the inner side of each rail, being provided with hooks or lips 29 that engage over the inner side of the rail base. These combined plates and clips have upturned terminals 30 provided with openings 31, through which is passed a fastening bolt 32. They are also provided with depending ends 33 engaging over opposite sides of the tie, said ends having openings 34 therethrough. A yoke 35 that passes beneath the tie 15, transversely thereof, has upturned terminals 36 extending on opposite sides of said tie and terminating short of the top of the same. These terminals pass behind the downturned ends of the clips and have outturned ends 37 that engage in the openings 34. Thus the structure is effectively held to the tie.

In the embodiment illustrated in Figs. 7–10 inclusive, the tie is shown at 38, and the rail is designated 39. A tie plate 40 is interposed between the rail and tie, and located on this tie plate, are rail securing plates 41 engaging over the opposite sides of the rail base. The clips in this instance, have depending substantially V-shaped portions 42 that extend on opposite sides of the tie 38 and have horizontal offset portions 43 that rest upon the rail securing plates 41. These portions 43 terminate in upstanding ends or ears 44, through which are passed securing bolts 45. A yoke 46 extends beneath the tie, and has upturned ends 47 engaged with the depending V-shaped portions 42 of the clips.

A slightly different form of structure is shown in Figs. 11–14 inclusive. In this embodiment, the tie is designated 48, and the rail 49. A tie plate 50, interposed between the tie and rail, has an upturned rail base engaging hook 51. A rail securing plate 52 located upon the opposite side of the tie plate engages over the rail base on the opposite side of the hook 51. Located upon this rail securing plate 52 are oppositely extending clips 53 having upturned terminals or ears 54, through which is passed a securing bolt 55. The clips have depending terminal portions 56 provided with enlarged terminal ears 57, and these ears are engaged by the hooked ends 58 of a yoke 59 that extends beneath the tie.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is—

1. The combination with a tie and a rail thereon, of a yoke passing beneath the tie, and rail-fastening means including elements engaging the ends of the yoke on opposite sides of the tie.

2. The combination with a tie and a rail thereon, of a yoke passing beneath the tie and having upturned ends on opposite sides of the tie and terminating short of its upper surface, and rail fastening means including depending elements interlocked with the ends of the yoke.

3. The combination with a tie and a rail thereon, of a yoke passing beneath the tie, and rail-fastening means including separate elements engaging the yoke on opposite sides of the tie, and means connecting said elements above the tie.

4. The combination with a tie and a rail thereon, of a yoke passing beneath the tie, and rail-fastening means including separate clips having downturned ends connected to the yoke on opposite sides of the tie and also having upturned ends located above the tie, and a bolt connecting said upturned ends.

5. The combination with a tie and a rail thereon, of a tie plate interposed between the tie and rail, separate elements having downturned portions engaging the yoke on opposite sides of the tie, said elements extending over the tie plate, and means connecting the elements above the tie and tie plate.

6. The combination with a tie, and a rail thereon, of a tie plate interposed between the tie and rail, and projecting beyond the rail, a rail securing plate located on the tie plate, a yoke extending beneath the tie and having upturned ends located on opposite sides of the tie, clips engaged with the ends of the yoke, and extending over the rail securing plate, and means connecting the clips above said plate.

7. The combination with a tie and a rail thereon, of a tie plate interposed between the tie and rail and projecting beyond said rail, a rail securing plate located on the tie plate and engaging the rail base, a yoke extending beneath the tie and having upturned ends on opposite sides of the same, clips having downturned ends on opposite sides of the tie engaged with the ends of the yoke, said clips having upturned ends arranged over the rail securing plate, and a bolt connecting the upturned ends.

8. The combination with a tie and a rail thereon, of a tie plate interposed between the tie and rail and having rail base engaging hooks on one side of the rail, a rail securing plate located on the tie plate and engaging the opposite side of the rail base, a yoke extending beneath the tie and having upturned ends located on opposite sides of the same, and terminating short of the top of said tie, clips extending over the tie plate, rail securing plates having downturned ends engaged with the ends of the yoke, said clips having upturned ends arranged over the rail securing clips, and a bolt passing through said upturned ends.

In testimony whereof I have hereunto set my hand in presence of two subscribing witnesses.

ALVUS H. MOFFET.

Witnesses:
ALICE TIEKELL,
NELLIE HEATON.